Feb. 5, 1957

J. F. THOMAS 2,780,712

SOLDERING DEVICE

Filed Feb. 16, 1955

JOHN F. THOMAS
*INVENTOR.*

BY Howard J. Whelan.
ATTORNEY

# United States Patent Office 2,780,712
Patented Feb. 5, 1957

2,780,712
SOLDERING DEVICE
John F. Thomas, Baltimore, Md.

Application February 16, 1955, Serial No. 488,591

8 Claims. (Cl. 219—27)

This invention relates to a soldering device and more particularly to one having a magazine for feeding solder to be melted by a heating means and forced from said device at predetermined intervals.

Hand-soldering operations on radio, television, telephone switchboards or the like which are fixed in place, or inconveniently located sometimes require the use of soldering iron to be positioned below the pieces to be soldered. The difficulty involved is the tendency for solder to run to the underside of the bit away from the piece to be soldered. This difficulty has been remedied in this invention by coating the bit, except for a small point with a material which causes a droplet of solder to be confined to the point of the bit. The bit can then be held upward with the solder at its topmost part, and applied to the pieces to be soldered. The material preferably used for coating the bit should be one having a negative interfacial tension for the solder compound used and should be one not wetted by solder at soldering temperatures. Coatings of ceramics, metallic (chrome) and various chemical compounds including silicones have been found by empirical formula to meet these requirements. It is therefore an object of this invention to provide a soldering device of the class described having predetermined parts of its soldering bit coated with a coating material having a negative interfacial tension for the soldering compound to be used. It is an additional object of this invention to provide a new and improved soldering device having interchangeable soldering bits with predetermined portions wetted and other portions coated with a non-wetted material to confine the molten droplet of solder in the wetted area for soldering at various angles.

It is a further object of this invention to provide a new and improved soldering device that will automatically project a stream of molten solder therefrom when held in various positions.

It is an additional object of this invention to provide a soldering device with a storage compartment of molten solder contained therein and a hole running from said storage compartment and through the soldering bit coated with a non-wetted agent, said hole being large enough to pass droplets of molten solder from said storage compartment, but small enough to prevent a continuous stream of molten solder to flow from said storage compartment when the tip is held downwardly in a vertical manner.

It is a further object of this invention to provide a soldering device having a feed means to force molten solder through a non-wetted porous material with holes small enough to support the molten solder column within the soldering device, until forced out by pressure.

An additional object of this invention is to provide a new and improved soldering device having an air vent and special passage for the flux to pass out with the molten solder to prevent the flux from boiling and sputtering and creating a block against the passage of molten solder from said soldering device.

It is an additional object of this invention to provide a new and improved soldering device with means for feeding solder into the melting compartment and then forcing it through the soldering bit which has portions of its working face wetted to hold the molten solder ready for application, and other portions coated with a non-wetted material to confine the molten solder to the wetted surface.

Other objects will become apparent as the invention is more fully set forth.

For a clearer understanding and depiction of the invention, reference is made to the accompanying drawings wherein particular forms of the invention are shown. These drawings in conjunction with the following description explain its preferred construction, indicate its principles and describe its operation, while the claims included show the scope of the invention.

Referring to the drawings.

Similar reference numerals refer to similar parts throughout the drawings.

Figure 1:
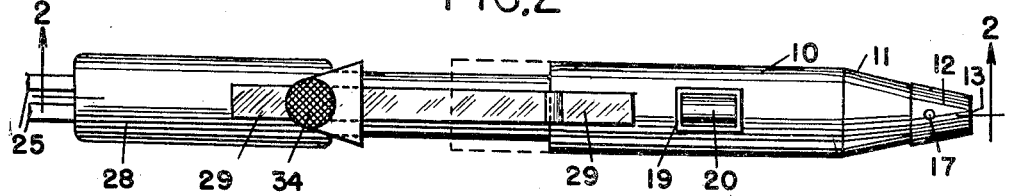
Figure 1 is a plan view of a soldering device having a magazine for feeding solder slugs into the device to be melted and force the molten solder from it and embodying this invention.

Referring to Figure 1 of the drawing a soldering bit 10 of round or irregular form is provided at its front end with angular faces 11 preferably coated with a material 12 having a negative interfacial tension for the solder used and should be one not wetted by solder at soldering temperatures. Coatings of ceramics, metallic (chrome) and various chemical compounds including silicones may be used for this purpose. The working end 13 of the soldering bit 10 is provided with a wetted surface to hold a droplet of molten solder ready for use. A passage 15 of restricted diameter is provided with a non-wetted material 16 having holes small enough to support the molten solder column within the soldering bit 10. An air vent 17 is provided in one of the angular faces 11 and 12 to prevent an air lock to form and permit the passage of the molten solder positioned between the air vent and the working end of the soldering bit 10. A groove 18 is provided in the passage to allow the heated flux to pass along with the melted solder to the working end 13 of the soldering bit 10 without causing the heated flux to boil and build up pressure sufficiently to blow the melted solder through the non-wetted porous material 16 and passage 15 before it can be used as intended. The rear end of the soldering bit 10 is provided with a magazine 19 to automatically feed solder slugs 20 to a storage compartment 21 where they are melted by a plunger heater 22 and form a molten mass 23 which is ejected as needed when the plunger heater 22 is pushed inwardly into storage compartment. The heater is of the low and high heat type and comprises a heating element 24 connected with feeders 25 energized from an outside source of electric current and when the heating element 24 is connected in series with the feeders 25 the heating unit will be on low heat, but when the insulated button 26 is depressed, it causes one side of the heating element 24 to be depressed until it makes contact with a shorting wire 27 which shortens the heating element 24 causing higher heat and faster melting of the solder to meet the requirements for faster use of the soldering device. The plunger heater 22 is provided with a handle 28. A feed arm 29 is attached to the rear end of the soldering bit 10 and passes through a slot 30 in a feed lever 31 pivotally attached to the handle 28. The feed lever 31 is provided with an elliptical hole 32 that encircles without touching the casing 33 of the plunger heater 22 and pulls on the feed arm 29 and soldering bit 10 to eject the molten solder 23 to the working end 13 and on to the materials to be fastened together by the solder. The upper end of the feed lever 31 is provided with a finger button 34 used to manipulate the feed lever 31.

Figure 2:
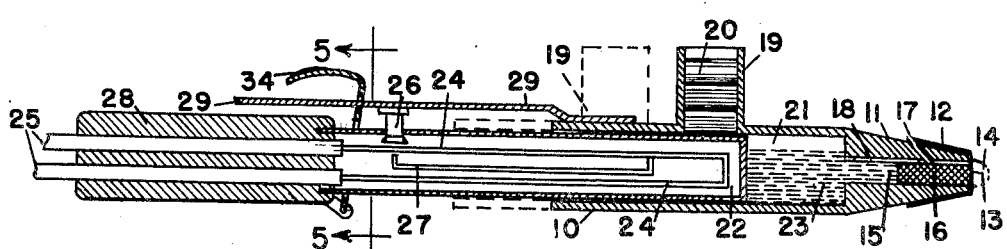
Figure 2 is a sectional view taken along line 2—2 of Figure 1.
Figure 3:
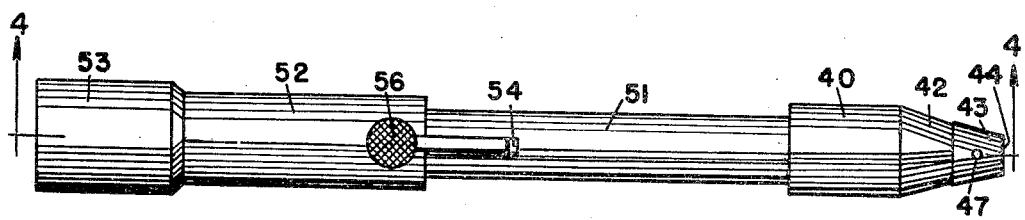
Figure 3 is a plan view of a modified form of soldering device for feeding wire solder into the device instead of the solder slugs.
Figure 4:
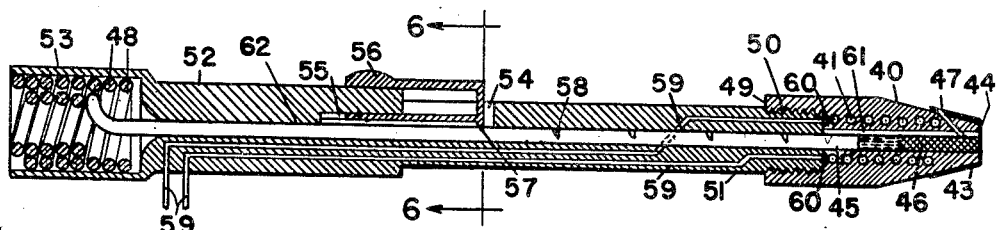
Figure 4 is a sectional view taken along line 4—4 of Figure 3.
Figure 5:
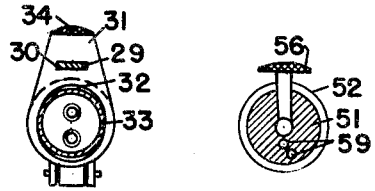
Figure 5 is a sectional view taken along line 5—5 of Figure 2.
Figure 6:
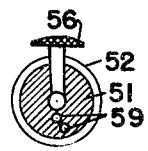
Figure 6 is a sectional view taken along line 6—6 of Figure 4.

Referring to Figures 3 and 4 of the drawing a modified form of soldering device is shown using a coiled solder wire instead of the solder slugs used in the soldering device shown in Figures 1 and 2. The soldering bit 40 used in Figures 3 and 4 is provided with a heating element 41 and angular faces 42, with the faces preferably coated with a material 43 having a negative interfacial tension for the solder used which should also be one not wetted by solder at soldering temperatures. Coatings of ceramics, metallic (chrome) and various chemical compounds including silicones as mentioned above may be used for the coating purpose. The working end 44 of the soldering bit 40 is provided with a wetted or tinned surface to hold a droplet of molten solder ready for use. A passage 45 is provided at one portion to receive the wire solder 48 and the outer end is provided with a porous non-wetted material 46 having holes small enough to support the column of molten solder within the soldering bit and feed it out gradually. An air vent 47 is connected to the passage 45 and prevents an air lock from forming in the passage 45 to delay the passage of the molten solder to the working end 44. The end 49 of the soldering bit 40 opposite the working end 44 is threaded at 50 to be removably attached to stem 51. The stem 51 is preferably formed integral with a handle 52 which terminates in a hollow magazine 53 used as a storage space for the wire solder 48 which is coiled around in the magazine 53 and fed through a hole 62 in the handle 52 and stem 51. An elongated slot 54 is formed in one portion of the stem 51 and connects with another elongated slot 55 in the handle 52 to receive and guide a solder feeder 56 so its tooth 57 can bite when pressed into the wire solder 48 forming a serration 58 to feed the solder from the magazine to the soldering bit 40. Feeders 59 pass through the stem 51 and terminate in raised projections 60 which bring electric energy to the heating element 41 and melts the solder as it passes through the soldering bit 40. A groove 61 is provided in the passage 45 of the soldering bit 40 to allow the heated flux to pass on to the working end 44 without boiling and sputtering, as explained for Figures 1 and 2.

In the operation of the soldering device shown in Figures 1 and 2, the solder slugs 20 are placed in the magazine 19 and the finger button 34 moved until the plunger heater 22 is moved out of the storage compartment 21 until a slug 20 falls in it. The electric current is turned on through the heating element 24 and when it is desired to increase or speedup the heating the insulated button 26 is pressed downwardly on the feed arm 29 until the heater wire 24 contacts the shorting wire 27 decreasing the length of the heating wire 24 and increasing its temperature to speed up the melting of the solder. The finger button 34 is then drawn backward towards the handle, causing the soldering bit 10 to slide back over the plunger heater 22 towards the handle, forcing the molten solder through the non-wetted porous material 16 and out to the working end 13 of the bit where it is used.

In the operation of the soldering device shown in Figures 3 and 4 the wire solder 48 is fed from the magazine 53 and through the passage 45 into the soldering bit 40 by the manipulation of the solder feeder 56. The electric source is connected to the feeders 59 and the solder melted and forced out through the non-wetted material 46 to the working end 44 by the unmelted wire solder as it is pushed along by solder feeder 56. The soldering bits 40 may be changed by unscrewing them from the stem 51, and the electrical connections 41 and 59 are reconnected by tightening the bit 40 on the stem 51.

Although non-wetted porous materials 16 and 46 are mentioned specifically to support the column of molten solder, it is understood the same results may be obtained by reducing the diameters of the passages 15 and 45 through the use of valves or other means for controlling the flow of molten solder through the passage.

The grooves 18 and 61 are preferably coated with a non-wetted material.

The working ends 13 and 44 are shown straight, but it is appreciated they can be of concave formation instead of straight and still be within the scope of the appended claims.

While but two general forms of the invention are shown in the drawings and described in the specification, it is not desired to limit this application for patent to these particular forms as it is appreciated that other forms could be made that would use the same principles and come within the scope of the appended claims. Having thus described the invention, what is claimed is:

1. A self feeding soldering iron of the class described comprising in combination a soldering bit, a plunger heater slidably positioned in said soldering bit, means on said plunger heater for supporting same, means for heating said soldering bit, a coating of non-wetted material having a negative interfacial tension not wetted at soldering temperatures applied to predetermined portions of said soldering bit to prevent molten solder from adhering thereto, said soldering bit having a passage therethrough, and porous non-wetted material having a negative interfacial tension not wetted at solder temperatures positioned therein.

2. A self feeding soldering iron of the class described comprising in combination, a soldering bit, a plunger heater slidably positioned in said soldering bit, means on said plunger heater for supporting same, means for heating said soldering bit, a coating of non-wetted material having a negative interfacial tension not wetted at soldering temperatures applied to predetermined portions of said soldering bit to prevent molten solder from adhering thereto, said soldering bit having a passage therethrough, and porous non-wetted material having a negative interfacial tension not wetted at solder temperatures positioned therein, a magazine for holding unmelted solder, and means for feeding solder from said magazine to said soldering bit.

3. A self feeding soldering iron of the class described comprising in combination, a soldering bit, a plunger heater slidably positioned in said soldering bit, means on said plunger heater for supporting same, means for heating said soldering bit, a coating of non-wetted mtaerial having a negative interfacial tension not wetted at soldering temperatures applied to predetermined portions of said soldering bit to prevent molten solder from adhering thereto, said soldering bit having a passage therethrough, and porous non-wetted material having a negative interfacial tension not wetted at solder temperatures positioned therein, a magazine for holding unmelted solder, and means for feeding solder from said magazine to said soldering, and means for increasing the melting capacity of said plunger heater.

4. A soldering device of the class described comprising a changeable soldering bit, means for feeding solder to said bit, means for melting said solder, a coating of non-wetted material having a negative interfacial tension not wetted at soldering temperatures applied to outer and inner portions of said soldering bit to prevent molten solder from adhering thereto, and a flux groove in said soldering bit.

5. A soldering device of the class described comprising a changeable soldering bit, means for feeding melted solder from said bit, means for melting said solder, a coating of non-wetted material having a negative interfacial tension not wetted at soldering temperatures applied to outer and inner portions of said soldering bit to prevent molten solder from adhering thereto, a flux groove in said soldering bit, said coating material comprising metallic chrome.

6. A soldering device of the class described comprising a changeable soldering bit, means for feeding melted solder from said bit, means for melting said solder, a coating of non-wetted material having a negative interfacial tension not wetted at soldering temperatures applied to outer and inner portions of said soldering bit to prevent molten solder from adhering thereto, a flux groove in said soldering bit, said coating material comprising silicones.

7. A soldering device of the class described comprising a changeable soldering bit, means for feeding melted solder from said bit, means for melting said solder, a coating of non-wetted material having a negative interfacial tension not wetted at soldering temperatures applied to outer and inner portions of said soldering bit to prevent molten solder from adhering thereto, a flux groove in said soldering bit, said coating material comprising a coating of ceramics.

8. A soldering device as set forth in claim 4 including an air passage extending from the aforesaid groove through the bit and through the aforesaid outer portion to the atmosphere.

References Cited in the file of this patent

UNITED STATES PATENTS

| | | |
|---|---|---|
| 672,433 | Arnaman | Apr. 23, 1901 |
| 1,619,817 | Gibson | Mar. 8, 1927 |
| 1,819,671 | Buccola | Aug. 18, 1931 |
| 1,928,576 | Stedley | Sept. 26, 1933 |
| 2,025,509 | Hieber | Dec. 24, 1935 |
| 2,094,795 | Johnson | Oct. 5, 1937 |
| 2,423,900 | Parker | July 15, 1947 |
| 2,432,009 | Haino | Dec. 2, 1947 |
| 2,449,521 | Warner | Sept. 14, 1948 |
| 2,452,360 | Dunham | Oct. 26, 1948 |

FOREIGN PATENTS

| | | |
|---|---|---|
| 585,884 | Great Britain | Feb. 27, 1947 |